United States Patent Office 3,306,888
Patented Feb. 28, 1967

3,306,888
AZO COMPOUNDS
George A. Mortimer, La Marque, Tex., assignor to Monsanto Company, a corporation of Delaware
No Drawing. Filed Dec. 9, 1963, Ser. No. 329,280
7 Claims. (Cl. 260—94.9)

The present invention relates to novel azo compounds, a method for their preparation, and their use as free-radical-generating catalysts or initiators in the polymerization of polymerizable compounds having ethylenic unsaturation.

It is an object of the invention to provide a new class of azo compounds which decompose thermally to yield free radicals at temperatures and rates which make them highly useful in chemical reactions.

It is another object of the invention to provide a process for preparing such free-radical-generating compounds which is relatively simple, efficient, and technically feasible.

It is a further object of the invention to provide a new class of catalysts or initiators for the polymerization of polymerizable compounds having ethylenic unsaturation.

It is a still further object of the invention to provide a process for kinetically steady-state polymerization of olefins such as ethylene, for example.

Other objects and advantages of the invention will become apparent to those skilled in the art from a consideration of the instant specification, examples, and claims.

In accordance with the invention, it has been found that novel azo compounds of the formula

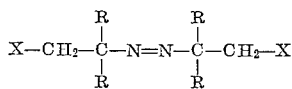

wherein R is an alkyl group having from 1 to 8 carbon atoms, and X is either an —OH group or an —OCOR' group wherein R' is an alkyl, a cycloalkyl, an aryl, an aralkyl, or an alkaryl radical, can be prepared by reacting an azodinitrile of the formula

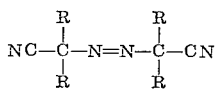

wherein R is an alkyl group having from 1 to 8 carbon atoms with an alcohol in the presence of an acid catalyst, hydrolyzing the intermediate azodiiminoester salt with water to convert it to the corresponding azodiester, selectively reducing said azodiester to produce the corresponding azodialcohol, and then where the azodiester product corresponding to the azodialcohol is desired, reacting said azodialcohol with an esterifying agent in the presence of a base.

Further, in accordance with the present invention, there is provided a method for polymerizing polymerizable compounds having ethylenic unsaturation which comprises bringing said compounds in contact with one or more of the novel azo compounds of the formula recited above under polymerization conditions.

Azodinitriles suitable as starting materials in the process of the invention include compounds such as azobisisobutyronitrile, azobis-2-ethylbutyronitrile, azobis-2-propylvaleronitrile, azobis-2-n-butylcapronitrile, azobis-2-n-pentylenanthonitrile, azobis-2-n-hexylcaprylonitrile, azobis-2-n-heptylpelargonic nitrile, azobis - 2 - n - octylcapronitrile, azobis-2-methylbutyronitrile, azobis-2 - ethylvaleronitrile, azobiscyclohexane-1-carbonitrile, azobis - 2,4-dimethylvaleronitrile, 2-(2'-isobutyronitrilo azo)-2-ethylvaleronitrile, and the like.

The alcohol reactant employed in the solvolysis step of the process of this invention is a primary or secondary alcohol, i.e., an alcohol having at least one hydrogen atom attached to the carbon atom to which the hydroxyl group is attached. Thus, alkyl, cycloalkyl, (alkyl)cycloalkyl, and aralkyl alcohols can be utilized. Alcohols having any number of carbon atoms in the molecule can be employed but, preferably, alcohols having fewer than 18 carbon atoms are used. Mixtures of these alcohols can also function as the alcohol reactant in this step of the process. Suitable alcohols include those having straight as well as branched chain radicals such as methanol, ethanol, 1- and 2-propanol, 1- and 2-butanol, 1- and 2-pentanol, 1-octanol, 2-ethyl-1-hexanol, 1-decanol, 1-dodecanol, cyclohexanol, 2-methylcyclohexanol, 1-butylcyclohexyl methanol, 1-(2'-methylcyclohexyl)-1-ethanol, benzyl alcohol, 2-phenyl-1-ethanol, 1-phenyl-1-ethanol, 3-phenyl-1-propanol, 1-phenyl-1-decanol, 8-phenyl-1-octanol, 2-methylbenzyl alcohol, 3-methylbenzyl alcohol, 2,4-dimethylbenzyl alcohol, and the like.

The reaction of the nitrile and the alcohol is catalyzed by a strong acid such as hydrochloric acid, sulfuric acid, nitric acid, phosphoric acid, benzenesulfonic acid, p-toluenesulfonic acid, trichloroacetic acid, or the like. Preferably, hydrochloric acid is employed. At least two equivalents of the acid catalyst are used for every equivalent of nitrile. Excess acid can be used; in fact, it is preferred since it accelerates the reaction.

The temperature of the reaction is maintained low enough to avoid decomposition of the azodinitrile, i.e., in general, below about 50° C. Preferably, the nitrile and alcohol are reacted at temperatures from about 0° C. to about 15° C. An inert solvent may be used if desired, but its use is not preferred unless the alcohol is solid at the reaction conditions.

The diiminoester salt which is formed as an intermediate in the first step of the process is then hydrolyzed by the addition of water. The salt may be isolated or not, as desired. Isolation is readily effected by filtration upon completion of the reaction between the nitrile and the alcohol. Recovery of the ester after hydrolysis is facilitated when the salt is isolated because following hydrolysis, the organic layer is separated, dried, and filtered to yield the azodiester.

In the second step of the process of the invention, the azodiester product is selectively reduced, leaving the azo group intact by reacting it in a suitable solvent with a hydride of aluminum or boron or complexes of such hydrides. Suitable reducing agents include, for example, lithium aluminum hydride, sodium aluminum hydride, lithium trimethoxyaluminohydride, sodium borohydride-aluminum chloride complex, sodium borohydride-lithium bromide complex, lithium borohydride, diborane, and the like.

Any solvent in which the hydride or hydride complex is soluble and is non-reactive can be used for the reduction step. Ethers such as diethyl ether, tretrahyrofuran, tetrahydropyran, dipropyl ether, dibutyl ether, dimethyl oxime, and the like or mixtures thereof can be employed. Alcohols are also useful as solvents for those boron derivatives which are relatively stable in alcohols.

The reduction is effected at temperatures below about 60° C. to prevent decomposition of the starting material.

The reduction product must be worked up in the absence of acid since under acidic conditions the azodialcohol product is destroyed. Upon completion of the reduction, water and an alkali metal hydroxide are added to the reaction mixture to destroy any excess hydride and yield a mobile slurry containing the product. The azodialcohol product can then be extracted from the slurry with a compound in which it is somewhat soluble and which is immiscible with water. Solvents useful for this purpose are methylene chloride, chloroform, carbon tetrachloride, diethyl ether, dipropyl ether, dibutyl ether, ethyl acetate, isopropyl acetate, isobutyl acetate, methyl butyrate, trichloroethylene, tetrachloroethylene, and the like. The product is then readily recovered by evaporation of the solvent.

The azodialcohol can be converted to the corresponding azodiester by any standard esterification procedure which can be carried out in the presence of a base. Suitable esterifying agents include such compounds as acetic anhydride, propionic anhydride, butyric anhydride, maleic anhydride, succinic anhydride, and the like, as well as acetyl chloride, propionyl chloride, isobutyryl chloride, n-butyryl chloride, benzoyl chloride, p-toluenesulfonyl chloride, benzenesulfonyl chloride, p-bromobenzenesulfonyl chloride, and the like.

A solvent is not required in the esterification step but may be employed if desired. Any solvent with which the azodialcohol does not react and in which the azodialcohol and esterifying agent are mutually soluble to some extent can be employed. In addition to methylene chloride, chlorinated hydrocarbons such as chloroform and carbon tetrachloride are suitable; other suitable solvents include esters such as methyl acetate, ethyl acetate, methyl isobutyrate, etc.; ketones such as acetone, methyl ethyl ketone, methyl isobutyl ketone, and the like; ethers such as diethyl ether, dipropyl ether, dibutyl ether, tetrahydrofuran, tetrahydropyran, and the like. When it is not desired to isolate the intermediate azodialcohol, the solvent used for extraction of the dialcohol from the reaction mixture can be employed as the solvent in the esterification step. Thus, the product in the solvent as recovered from the extraction of the reaction mixture in the reduction step can be subjected directly to esterification.

Any base which is soluble in the solvent employed can be employed as a catalyst for the esterification. Suitable compounds include alkali metal hydroxide such as sodium hydroxide, potassium hydroxide, lithium hydroxide, and the like; and tertiary amines such as pyridine and substituted pyridines, triethylamine, trimethylamine, quinoline, isoquinoline, dimethyl aniline, dimethyl-p-toluidine, and the like. Excess liquid organic base can be employed as the solvent in the reaction if desired.

The esterification is preferably carried out at ambient or room temperature. However, any temperature below that at which the azodialcohol begin to decompose, i.e., about 150° C., can be employed.

The azodiester is recovered from the reaction mixture by extracting the mixture with a dilute alkaline solution such as an aqueous solution of sodium carbonate and an acid solution such as aqueous HCl and drying it over sodium sulfate. Evaporation of the solvent yields the crude product which is readily purified by distillation or recrystallization using well-known techniques.

Both the novel azodialcohols and azodiesters of the invention are capable of extensive use as initiators or catalysts for polymerization because their decomposition rate is independent of the medium and, therefore, can be accurately known. They can be labeled with $C^{14}$ and used to trace initiator residues in polymers because the radicals formed upon elimination of nitrogen do not undergo any further fragmentation. They have these advantages in common with the azodinitriles such as azobisisobutyronitrile but are superior to the nitriles in that they decompose thermally at higher temperatures and can furnish free radicals at a constant or nearly constant rate at such temperatures over a period of time which makes them highly desirable for effecting kinetically steady-state polymerization and for use, for example, in kinetic polymerization studies.

The invention is illustrated in the following examples which are, however, not to be construed as limiting it in any manner whatsoever.

EXAMPLE 1

About 90.0 g. (0.548 mole) of azobisisobutyronitrile and 600 ml. of methanol were charged to a one-liter, four-necked flask fitted with a stirrer, immersion thermometer, and two gas inlet tubes. The slurry was stirred and a cooling bath was used to lower its temperature to −5° C. Dry HCl was rapidly passed into the mixture and the cooling bath was held near −20° C. in order to maintain the reaction temperature between 5 and 10° C. After about two hours, no more HCl was absorbed and the slurry became a clear solution. The solution was allowed to stand overnight at 0° C. The mixture was cooled to −70° C. to complete precipitation of the diiminoester dihydrochloride and then subjected to rapid suction filtration. The precipitate was stirred into a mixture of ice and water until all the solid disappeared. The liquid mixture was filtered to remove particulate matter. The organic layer was separated, washed with water, dried over sodium sulfate, and filtered to yield 85.0 g. (74%) of liquid dimethyl azobisisobutyrate which after cooling and solidification had a melting point of 28–30° C. (literature 30°, 33°).

A solution of the 85.0 g. (0.354 mole) of dimethyl azobisisobutyrate in 150 ml. of ether was added over a period of 45 minutes at a rate to maintain a good reflux to 17.1 g. (0.450 mole) of lithium aluminum hydride in 300 ml. of ether contained in a one-liter flask fitted with a stirrer, a dropping funnel, and a reflux condenser. A continuous nitrogen purge was maintained in the flask. The reaction mixture was refluxed for an additional hour. Excess hydride was decomposed by the slow addition of a solution of 40 ml. of water and 20 ml. of tetrahydrofuran. Then at 45% solution of potassium hydroxide was added to the mixture until the salts coagulated and left a clear water layer. The mixture was diluted with 10% potassium hydroxide and extracted with ether. The extracted ether layers were filtered and dried over sodium sulfate. Evaporation of the solvent left 41.3 g. (67%) of solid azobisisobutanol. Recrystallization of this compound from a 1:10 pyridine-cyclohexane solvent mixture gave pure white crystals having a melting point of 108° C. (hot stage, corr.). The infrared spectrum contained a strong hydroxyl band but no carbonyl band.

EXAMPLE 2

Azobisisbutanol was prepared as in Example 1 and 16.6 g. (0.095 mole) of this compound together with 125 ml. of methylene chloride, 25 ml. (0.31 mole) of pyridine, and 25 ml. (0.26 mole) of acetic anhydride were placed in a stoppered flask, swirled, and allowed to stand overnight. The solution was thoroughly extracted with sodium carbonate and hydrochloric acid solutions, after which it was dried over sodium sulfate. The solvent was evaporated and 21.3 g. (86%) of the crude ester product was obtained. Vacuum distillation of this material gave 19.2 g. (77%) of a yelow liquid having a boiling point from 90 to 92.5° at 1.5 mm., a melting point of 16.5 to 17.0° C., and an index of refraction at 25° C. of 1.4317. The infrared and NMR (nuclear magnetic resonance) spectra established the structure of the compound as that of azobisisobutanol diacetate which had the following elemental analysis.

Found: C, 55.54; H, 8.57; N, 11.05; O, 24.84. Calculated (for $C_{12}H_{22}N_2O_4$): C, 55.79; H, 8.58; N, 10.85; O, 24.78.

Thermal decomposition data for azobisisobutanol diacetate are presented in Table I below. These data are fit by the equation $k_d = 6 \times 10^{16} e^{-42,800/RT}$. They were obtained as follows: Sealed tubes containing 3.5 ml-aliquots of a solution of 3.2 g. of azobisisobutanol diacetate in 100 ml. of spectrograde cyclohexane were placed in a constant temperature bath held to within ±0.1° C. of the temperature given in Table I. When the tubes had come to constant temperature, they were removed individually from the bath at fixed times and cooled by quenching. The concentration of undecomposed initiator was determined from the intensity of the 370 mμ band in the ultraviolet spectrum. Experiments generally were run to 90% decomposition. The results given were obtained by least squares fit of the data.

TABLE I

| Temperature, °C. | Number of Points | $k_d \times 10^4$/sec. |
|---|---|---|
| 170.0 | 8 | 0.486±0.005 |
| 180.0 | 8 | 1.27±0.404 |
| 189.0 | 6 | 3.47±0.24 |
| 199.9 | 8 | 10.1±0.3 |

EXAMPLE 3

A series of tests were conducted to show the utility of the novel azo compounds of the invention as catalysts for the polymerization of ethylene. In each test, a stainless steel reaction bomb together with all accessory lines connected thereto were carefully cleaned and flushed with ethylene to eliminate all traces of air or oxygen. The bomb was then filled with ethylene at 130° C. at atmospheric pressure. The desired amount of the azo compound used as the initiator was injected by means of a hypodermic needle into a separate small compartment of the bomb in such a manner as to exclude all air or oxygen. Additional hot ethylene and a polymerization modifier were pumped into the bomb until the pressure reached approximately 7,500 p.s.i. while the temperature was raised to the desired level. The mechanical agitator inside the bomb was started and the initiator present in the compartment was forced into the bomb by means of high pressure ethylene. Additional ethylene was then charged to the bomb until the total pressure was 20,000 p.s.i. at the desired temperature level. After the desired reaction time, excess ethylene was bled off, and the product was recovered and analyzed in a conventional manner. Results are presented in Table II below.

unsaturation consists in a terminal methylene, $CH_2$, joined by an ethylenic double bond to its neighboring carbon atom, i.e., consists in a $CH_2=C<$ group. Compounds which are subject to polymerization and copolymerization using the azo initiators of the present invention include, for example, olefins such as propylene and isobutylene in addition to the ethylene exemplified; acrylic, halocrylic and methacrylic acids, esters, nitriles and amides such as, for example, acrylonitrile, methyl methacrylate, ethyl methacrylate, butyl methacrylate, octyl methacrylate, cyclohexyl methacrylate, methoxymethyl methacrylate, n-butoxyethyl methacrylate, n-butoxyethoxyethyl methacrylate, aminoalkyl methacrylates such as beta-diethylaminoethyl methacrylate, methacrylic acid, ethyl acrylate, methyl acrylate, and alpha-chloroacrylic acid; vinyl and vinylidene halides such as vinyl chloride, vinyl fluoride, vinylidene chloride, vinylidene fluoride, 1-fluoro-1-chloroethylene; vinyl carboxylates such as vinyl acetate, vinyl trimethylacetate, vinyl hexanoate, vinyl laurate, vinyl chloroacetate, vinyl propionate, and vinyl stearate; N-vinyl imides such as N-vinylphthalimide and N-vinylsuccinimide; N-vinyl lactams such as N-vinylcaprolactam and N-vinylbutyrolactam; vinyl aromatics such as styrene, substituted styrenes such as alpha-methylstyrene and vinyl naphthalene; and other vinyl derivatives such as methyl vinyl ketone, vinylpyridine, vinyl isobutyl ether and vinyl ethyl ether.

Specific examples of copolymers which may be prepared using the azo compounds as catalysts or initiators with mixtures of ethylenically unsaturated compounds include ethylene-vinyl chloride, ethylene-tetrafluoroethylene, acrylonitrile-isobutylene, acrylonitrile-vinylpyridines, isobutylene-vinylidene chloride, ethylene-vinyl acetate, isobutylene-vinyl acetate, vinyl acetate-vinyl methyl ether, monovinylacetylene-styrene, methyl methacrylate-styrene, styrene-acrylonitrile, methyl methacrylate-vinyl acetate, monovinylacetylene-vinyl acetate, styrene-butadiene, and the like.

TABLE II

| Run | Initiator | Amt. of Initiator (Mole/l) | Temp., °C. | Time (Min.) | Modifier | Conv. (Percent) | Polymer Properties ||| 
|---|---|---|---|---|---|---|---|---|---|
| | | | | | | | Melt Index (dg./min.) | Density | Intrinsic Viscosity (p-xylene, 105° C.) |
| A | Azobisisobutanol | 2.07×10⁻⁴ | 199 | 27 | Isopropanol 0.3% | 1.5 | <0.001 | 0.921 | |
| B | Azobisisobutanol diacetate | 2.07×10⁻⁴ | 171 | 2.5 | Xylene 0.6% | 1.1 | 0.013 | 0.926 | |
| C | Azobisisobutanol diacetate | 2.07×10⁻⁴ | 168 | 17 | Cyclohexane 1.2% | 5.9 | <0.001 | 0.924 | |
| D | Azobisisobutanol diacetate | 5.4×10⁻⁵ | 167 | 20 | Cyclohexane 1.2% | 3.1 | <0.001 | 0.924 | |
| E | Azobisisobutanol diacetate | 5.4×10⁻⁵ | 167 | 60 | Propane 11.2% Benzene 0.2% | 6.8 | 0.76 | 0.931 | 1.05 |
| F | Azobisisobutanol diacetate | 5.4×10⁻⁵ | 167 | 21 | Propane 11.2% Benzene 0.2% | 2.4 | 2.5 | 0.931 | 1.01 |
| G | Azobisisobutanol diacetate | 5.4×10⁻⁵ | 167 | 40 | Propane 11.2% Benzene 0.2% | 4.3 | 1.4 | 0.932 | |

The invention has been described particularly with reference to the use of the present azo compounds as catalysts or initiators for the polymerization of ethylene but these compounds can be employed in general for the addition polymerization, including copolymerization, of polymerizable compounds containing ethylenic double bonds, i.e., the $>C=C<$ group. Thus, unsaturated polymerizable compounds in which the unsaturation is due to a single terminal methylene group which is attached to a negative radical can be polymerized with the azo compounds as initiators. The process of the invention is likewise applicable to polymerizable vinylidene compounds including vinyl compounds and to polymerizable acrylyl and alkacrylyl compounds. It is also applicable to polymerizable compounds having a plurality of ethylenic linkages of aliphatic character whether conjugated or isolated. It is particularly applicable to that class of polymerizable unsaturated compounds wherein the carbon-to-carbon Polymerizable compounds that have a plurality of ethylenic double bonds which may be polymerized or copolymerized using the azo compounds as initiators include those having conjugated double bonds such as butadiene, 2-chlorobutadiene, 2-fluorobutadiene, and 2-phenoxybutadiene. Compounds containing two or more ethylenic double bonds which are isolated with respect to each other which can be polymerized include those having two or more ethylenic groups conjugated with a carboxylic group, for example, methacrylic anhydride, acrylic and substituted acrylic esters of polyhydric alcohols such as ethylene glycol dimethacrylate, diethylene glycol dimethacrylate, triethylene glycol dimethacrylate, tetraethylene glycol dimethacrylate, diethylene glycol diacrylate, and mixtures of such esters, for example, dimethacrylate esters of a mixture of polyethylene glycols. Compounds having one ethylenic group conjugated with a carboxylic group that can be polymerized include diallyl maleate, vinyl methacrylate, allyl methacrylate, crotyl methacrylate, and methallyl methacrylate. Compounds which have no conjugation of the polymerizable ethylenic group with carboxylic groups which can be polymerized include diallyl phthalate, diallyl carbonate, diallyl adipate, diallyl fumarate, divinyl succinate, divinyl adipate, and divinyl benzene.

Other compounds which can be polymerized with the azo initiators of the invention, though less preferred than those mentioned previously, are the fumaric esters. Derivatives of fumaric and maleic acid are particularly valuable in the preparation of copolymers. Thus, maleic anhydride and dialkyl esters of fumaric and maleic acids, for example, diethyl and dimethyl fumarate and maleate, may be copolymerized with ethylene, vinyl chloride, or styrene by the process of this invention. Other copolymers thus obtainable according to the invention include copolymers of ethylene, propylene, isobutylene, and 2-ethylhexene-1 with maleic anhydride; copolymers of isobutylene with vinyl acetate and dimethyl fumarate or dimethyl maleate; copolymers of allyl chloride with maleic anhydride; copolymers of styrene with maleic anhydride and the condensation product of maleic anhydride and ethylene glycol; and the copolymer of styrene with the condensation product of maleic anhydride and propylene oxide. Carbon monoxide, sulfur dioxide, and acetylene are likewise copolymerizable with ethylene according to the present invention.

The optimum conditions for the polymerization of any unsaturated compound subject to addition polymerization with the azo compounds employed as catalysts or initiators as disclosed herein will, of course, vary from monomer to monomer and will depend upon the particular azo compound employed. Thus, gases such as ethylene and propylene normally require pressure whereas pressure is not essential in the case of styrene. Similarly, the various azo compounds which are generally effective at higher temperatures will vary in effectiveness depending upon the particular temperature employed.

The polymerizations will usually be carried out at temperatures in the range from about 150 to 300° C. The amount of the azo compound employed as catalyst is subject to wide variation and varies between 0.0001 and 5% based on the moles of polymerizable compounds present. Preferably, amounts between about 0.0003 and about 0.3% are used.

The polymerizations may be carried out by conventional methods such as by bulk, solution, emulsion, or granular techniques.

What is claimed is:
1. Compounds of the formula

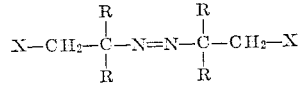

wherein R is an alkyl group having from 1 to 8 carbon atoms and X is chosen from the group consisting of the —OH radical and the —OCOR' radical wherein R' is chosen from the group consisting of alkyl, cycloalkyl, aryl, aralkyl, and alkaryl radicals.

2. Azobisisobutanol.
3. Azobisisobutanol diacetate.
4. The method of polymerizing ethylenically unsaturated monomers which undergo addition polymerization which comprises bringing said monomers under polymerization conditions including a temperature in the range from about 150° to about 300° C. in contact with a catalytic amount of an azo compound of the formula

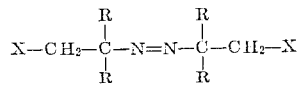

wherein R is an alkyl group having from 1 to 8 carbon atoms and X is chosen from the group consisting of the —OH radical and the —OCOR' radical wherein R' is chosen from the group consisting of alkyl, cycloalkyl, aryl, aralkyl, and alkaryl radicals.

5. The method of polymerizing ethylene which comprises bringing ethylene under polymerization conditions including a temperature in the range from about 150° to about 300° C. in contact with a catalytic amount of an azo compound of the formula

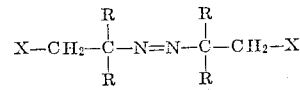

wherein R is an alkyl group having from 1 to 8 carbon atoms and X is chosen from the group consisting of the —OH radical and the —OCOR' radical wherein R' is chosen from the group consisting of alkyl, cycloalkyl, aryl, aralkyl, and alkaryl radicals.

6. The method of polymerizing ethylene which comprises bringing ethylene under polymerization conditions including a temperature in the range from about 150° to about 300° C. in contact with azobisisobutanol.

7. The method of polymerizing ethylene which comprises bringing ethylene under polymerization conditions including a temperature in the range from about 150° to about 300° C. in contact with azobisisobutanol diacetate.

References Cited by the Examiner

UNITED STATES PATENTS 2,471,959  5/1949  Hunt _____ 260—192
2,713,576  7/1955  De Benneville _____ 260—192

FOREIGN PATENTS 929,182  6/1963  Great Britain.

OTHER REFERENCES

Morrison et al., Organic Chemistry, Allyn and Bacon, Inc., Boston, 1959. (Pages 482–485 relied on.)

JOSEPH L. SCHOFER, *Primary Examiner.*

JAMES A. SIEDLECK, *Examiner.*

M. B. KURTZMAN, *Assistant Examiner.*